(12) United States Patent
Hardacker et al.

(10) Patent No.: US 8,387,096 B2
(45) Date of Patent: Feb. 26, 2013

(54) WEB-BASED PERSONAL VIDEO RECORDER (PVR)-TYPE SUBSCRIPTION SERVICE

(75) Inventors: Robert Hardacker, Escondido, CA (US); Robert Allan Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 340 days.

(21) Appl. No.: 12/357,673

(22) Filed: Jan. 22, 2009

(65) Prior Publication Data
US 2010/0186057 A1 Jul. 22, 2010

(51) Int. Cl.
*H04N 5/445* (2011.01)
*H04N 7/173* (2011.01)

(52) U.S. Cl. ............ 725/51; 725/88; 725/91; 725/100; 725/151

(58) Field of Classification Search ............ 725/51, 725/88, 91, 100, 109, 110, 114, 131
See application file for complete search history.

(56) References Cited

U.S. PATENT DOCUMENTS

| | | | |
|---|---|---|---|
| 6,769,127 B1 | 7/2004 | Bonomi et al. | |
| 7,325,043 B1 | 1/2008 | Rosengerg et al. | |
| 7,631,331 B2 * | 12/2009 | Sie et al. | 725/46 |
| 7,647,614 B2 * | 1/2010 | Krikorian et al. | 725/94 |
| 2003/0149574 A1 | 8/2003 | Rudman | |
| 2004/0181800 A1 * | 9/2004 | Rakib et al. | 725/25 |
| 2005/0097599 A1 * | 5/2005 | Plotnick et al. | 725/32 |
| 2005/0132401 A1 * | 6/2005 | Boccon-Gibod et al. | 725/34 |
| 2006/0117371 A1 * | 6/2006 | Margulis | 725/131 |
| 2007/0050294 A1 * | 3/2007 | Trottier et al. | 705/50 |
| 2007/0107017 A1 * | 5/2007 | Angel et al. | 725/62 |
| 2008/0098426 A1 * | 4/2008 | Candelore | 725/38 |
| 2008/0098433 A1 * | 4/2008 | Hardacker et al. | 725/52 |
| 2008/0109513 A1 | 5/2008 | Fishhaut et al. | |
| 2009/0300502 A1 * | 12/2009 | Johnson et al. | 715/733 |

FOREIGN PATENT DOCUMENTS

WO 2008072045 6/2008

OTHER PUBLICATIONS

Cisco Systems, Inc. "Cisco IP/TV Content Manager User Guide, version 3.4" http://www.cisco.com/en/US/docs/app_ntwk_services/waas/iptv/v34/cm/user/guide/chap1.html.

* cited by examiner

*Primary Examiner* — Kieu Oanh T Bui
(74) *Attorney, Agent, or Firm* — John L. Rogitz

(57) ABSTRACT

A web-based subscription service PVR system. An Internet server maintains, for each subscriber, the subscriber's aggregated content including digital rights management (DRM) rules for each piece of content as defined by the content provider. Pointers to requested content are provided.

19 Claims, 2 Drawing Sheets

WEB-BASED PERSONAL VIDEO RECORDER (PVR)-TYPE SUBSCRIPTION SERVICE

I. FIELD OF THE INVENTION

The present invention relates generally to web-based PVR-type subscription services.

II. BACKGROUND OF THE INVENTION

In-home recording devices for TV programming have been provided. As understood herein, maintaining personal video recorders (PVR), video cassette recorders (VCR), and other like in-home audio video programming recording device entails effort and cost. Furthermore, such devices can fail, resulting in the loss of recorded programming. For example, PVR usually incorporate hard disk drives (HDD) as the storage medium and HDD can fail.

As still further recognized herein, a HDD might be limited in terms of storage such that when the HDD is full, the right to view content is lost after a new HDD is installed.

SUMMARY OF THE INVENTION

As understood herein, it would be advantageous to provide a system and method that replaces an in-home PVR such that in-home PVR equipment is not required, obviating the concomitant concern about HDD failures. As described below, this may be accomplished by splitting the PVR function between the home and an Internet server, which can serve as a storage device. Thus, a client-server split of PVR functionality is provided, with a potentially "thin" client existing in/at the TV, and the server being in the Internet "cloud". This permits the client physically to be anywhere which permits a user to access to "his" PVR while traveling without requiring an uplink from his home. Also, multiple client devices can access one net PVR associated uniquely with that user. Password (or similar) protection for privacy may be used to access the Internet-based PVR.

The server-based PVR can record contemporaneous programming (e.g., network programs that are not subsequently made available on the net for everyone). It also maintains links to requested content that is publicly available via the net. Network connected home servers can also provide content links. This means that the net PVR could be a combination of hard recorder (in the "cloud") and virtual links such that the user interface and usage experience match the user's familiar paradigm of a PVR.

Content management can be done from either the client/TV or a PC accessed web link. This facilitates the typical PVR programming menu augmented with material generally available only via PC. Real-time playback control remains at the client.

Accordingly, a method includes receiving from a home component a recorder control signal including at least one signal selected from: fast forward, skip, reverse, play, as a user might browse to determine available content. The method includes sending the signal through the Internet to a recorder subscription server and receiving back from the Internet audio video programming compliant with the signal.

A TV and/or a set-top box typically receives the control signal from a remote control, although alternatively the remote control may be used to select a PVR function from a menu of functions displayed on the TV. If the remote control transmits a "pause" signal the server sends to the STB and/or TV a freeze frame of video for presentation on a display associated with the TV. In contrast, if the remote control transmits a "reverse" signal the server sends a selected audio video in reverse for presentation thereof on a display associated with the TV. Yet again, if the remote control transmits a "fast forward" the server sends video to the STB and/or TV at a faster than a normal frame rate. On the other hand, if the remote control transmits a "skip" signal the server omits a segment of video and immediately begins sending a subsequent segment.

In another aspect, a home system that does not include a personal video recorder (PVR) does include a remote control manipulable to send PVR command select signals. A TV receives the PVR select signals and an Internet interface relays PVR commands associated with the select signals to an Internet server. In response the interface receives signals from the Internet for display on the TV mimicking PVR functionality.

In another aspect, a subscription server includes a processor receiving PVR commands over the Internet from a home entertainment system and a computer readable storage medium accessible to the processor and bearing a PVR module executable by the processor to provide audio video to the home entertainment system in accordance with the PVR commands. The server can send content to the home entertainment system only if the server determines that digital rights management (DRM) provisions have been satisfied by the home entertainment system or by a user thereof. Likewise, the server can send content to the home entertainment system only if an active subscription with the home entertainment system is in force. Content demanded by the home entertainment system may be stored locally at the server. Or, content demanded by the home entertainment system may not be stored locally at the server, with the server maintaining a pointer to the content located elsewhere on the Internet.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
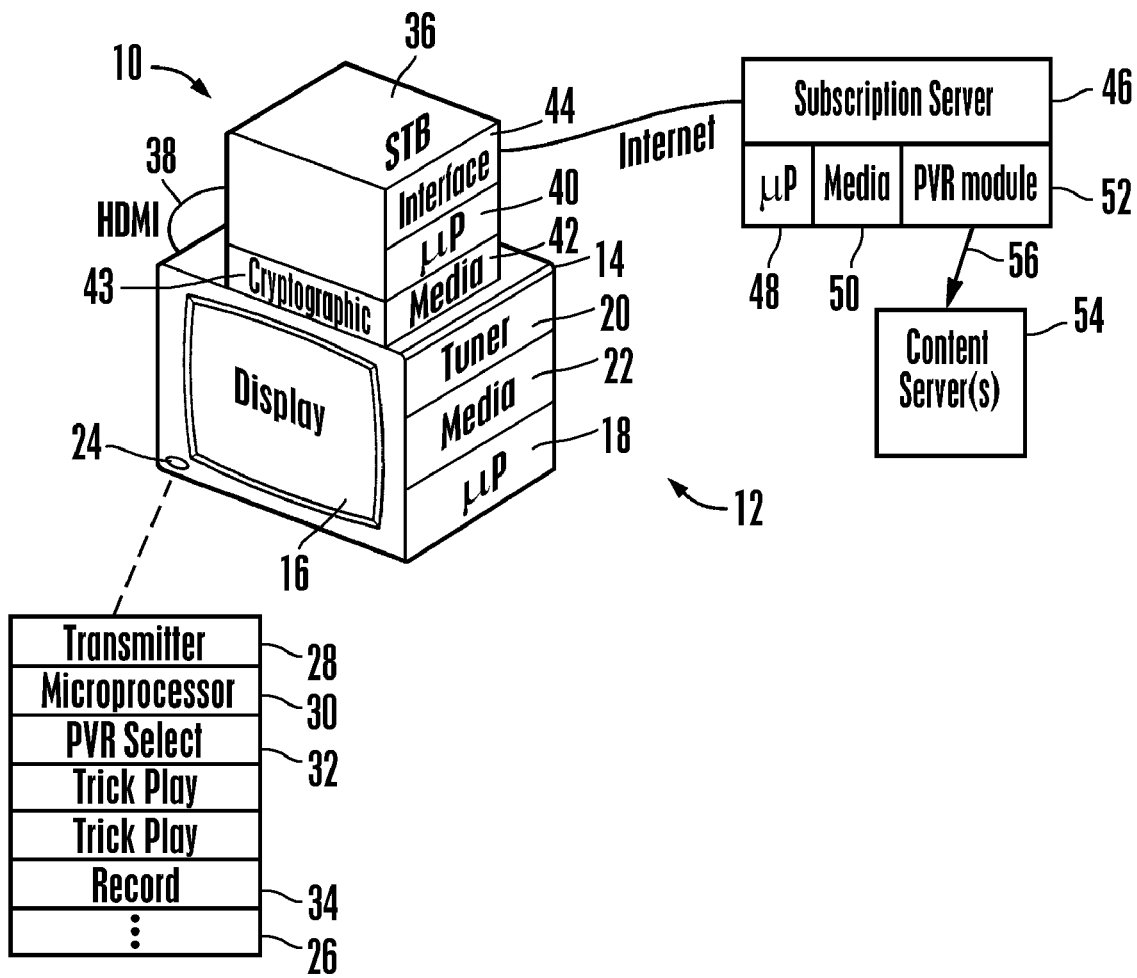
FIG. 1 is a block diagram of an example system in accordance with present principles.

Referring initially to FIG. 1, a system 10 includes a TV system 12 that in one implementation includes a TV chassis 14 holding a TV display 16 such as a standard definition and/or high definition display, e.g., a matrix-type flat panel display. The display 16 under control of a TV processor 18 in the chassis 14 presents signals from a TV tuner 20 in the chassis 14, it being understood that the above components may be implemented in concert with, e.g., a set-top box.

The processor 18 accesses a computer-readable medium 22 such as solid state storage or disk-based storage. The processor 18 can receive, via a wireless IR or RF or other wireless receiver 24, wireless user command signals generated by a remote control 26. Accordingly, the remote control 26 may include a wireless transmitter or transceiver 28 controlled by a RC processor 30 to send to the TV component select signals such as a "select PVR function" signal that is generated when a user manipulates a PVR select key 32. While "PVR" is used herein it is but one example of a TV programming recording device.

One or more PVR trick play keys 34 may be provided on the remote 26. Such trick play keys, when manipulated, can result in the generation of commands such as "stop", "fast forward", "reverse", "skip", etc., to cause a video under control to respectively stop, play forward at a faster than normal speed, play in reverse, and skip over entire segments. Additionally, record control keys 34 may be provided to input content recording signals, such as, e.g., "record the show presently highlighted on a program guide being displayed on the TV display 16", recording time, recording channel, etc. Such keys 34 may be as simple as a "select" or "enter" key.

In one implementation the system 10 may include an internet capable set top box (STB) 36 that may be connected to the TV using a high definition multimedia interface (HDMI) link 38 as shown, it being understood that the STB 36 functionality may be incorporated into the TV chassis 14. The STB 36 includes a STB processor 40 accessing a computer-readable storage medium 42 that may store a cryptographic module 43, such that the STB 36 may handle any necessary cryptography between the below-described subscription server and the TV with the HDMI link 38 handling the link layer protection between the STB 38 and TV 12. When no STB is used digital transmission content protect (DTCP)-Internet Protocol may be used as an alternative link from the Internet to the TV along with a relatively lower bandwidth connection to the TV. In either case, digital rights management (DRM) advantageously may be provided by means of the HDMI link or DTCP link.

As also shown, the STB 36 may include an Internet interface 44 such as but not limited to a modem, a WiFi wireless transceiver, etc. In this way, the STB 36 and, hence, the TV processor 18 may communicate over the Internet with a subscription server 46 which may include one or more server processors 48 accessing one or more tangible computer-readable media 50 on which may be stored an executable PVR module 52. The server processor 48 may execute an instance of the PVR module 52 for each active user to respond to PVR-related commands from the remote control 26 and thus to mimic a PVR in accordance with disclosure below. Content commanded by the user to be "recorded" (essentially, to be made available on command) may be stored on the media 50 of the subscription server 46 or, in response to a "record" or "get" content command from a user's remote control, may simply be searched for and found on other content servers 54, with the subscription server 46 including pointers 56 to each piece of content on remote content servers 54.

Figure 2:
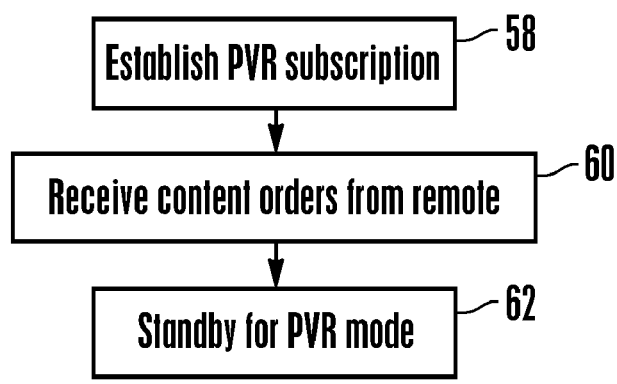
FIG. 2 is a flow chart of example set up logic.

With the above example system in mind, attention is directed to FIG. 2. At block 58 a PVR subscription is established by the user of the home network with the subscription server 46. Many ways may be employed to establish the subscription. By way of non-limiting example, a cross-menu bar (XMB) or other user interface may be presented on the TV display 16 upon initial power-on or user selection that asks whether the user would like to subscribe to PVR services. The user can respond by appropriately manipulating the remote control 26. If the user selects the service, connection may be established between the system 10 and the server 46 and the user walked through a series of screen displays to present appropriate pricing and input appropriate credit card information and the like to establish a service, which may be automatically renewed periodically if desired by charging the user's credit card.

Once the subscription has been established content orders may be received by the server 46 at block 60. The content orders may be generated in one or more ways. For example, using the remote control and the PVR keys 32, 34 etc. as he would using a conventional PVR remote control, the user can select a show from an electronic program guide (EPG) on the TV display 16 for "recording". The command can be relayed by the TV processor 18/STB processor 40 to the subscription server 46, which notes the requested content and locates it on the Internet. The subscription server 46 may either store the content locally on its media 50 or it may simply record the title of the content along with a pointer 56 to a content server 54 on which the actual content resides for later playback on command.

As an alternative, the user may input preferences to the server 46 through the TV 12/STB 36 for types of content to aggregate (or find) such as series, sports, actors, directors, movies, etc. The preferences may include buying or renting content within the user-established monetary limits. The system may also or alternatively learn user preferences and based thereon suggest content to the user by, e.g., displaying a message on the TV screen suggesting the content. For example, expert systems may be used for content recommendation, e.g., if a user selects a particular TV show starring a particular actor, the system can suggest as additional content other TV shows starring the same actor.

Furthermore, under such circumstances the subscription server 46 may handle and maintains any requisite digital rights management (DRM) licenses as required. For example, if the user selects a type of content and some or all of the content is associated by the content provider with DRM provisions, the server 46 may send signals back to the home system 10 displaying such DRM provisions and ensuring that the user agrees to the provisions prior to making any requested content available. Once content has been identified and any DRM provisions attended to, the system waits at state 62 for subsequent PVR mode commands.

Figure 3:
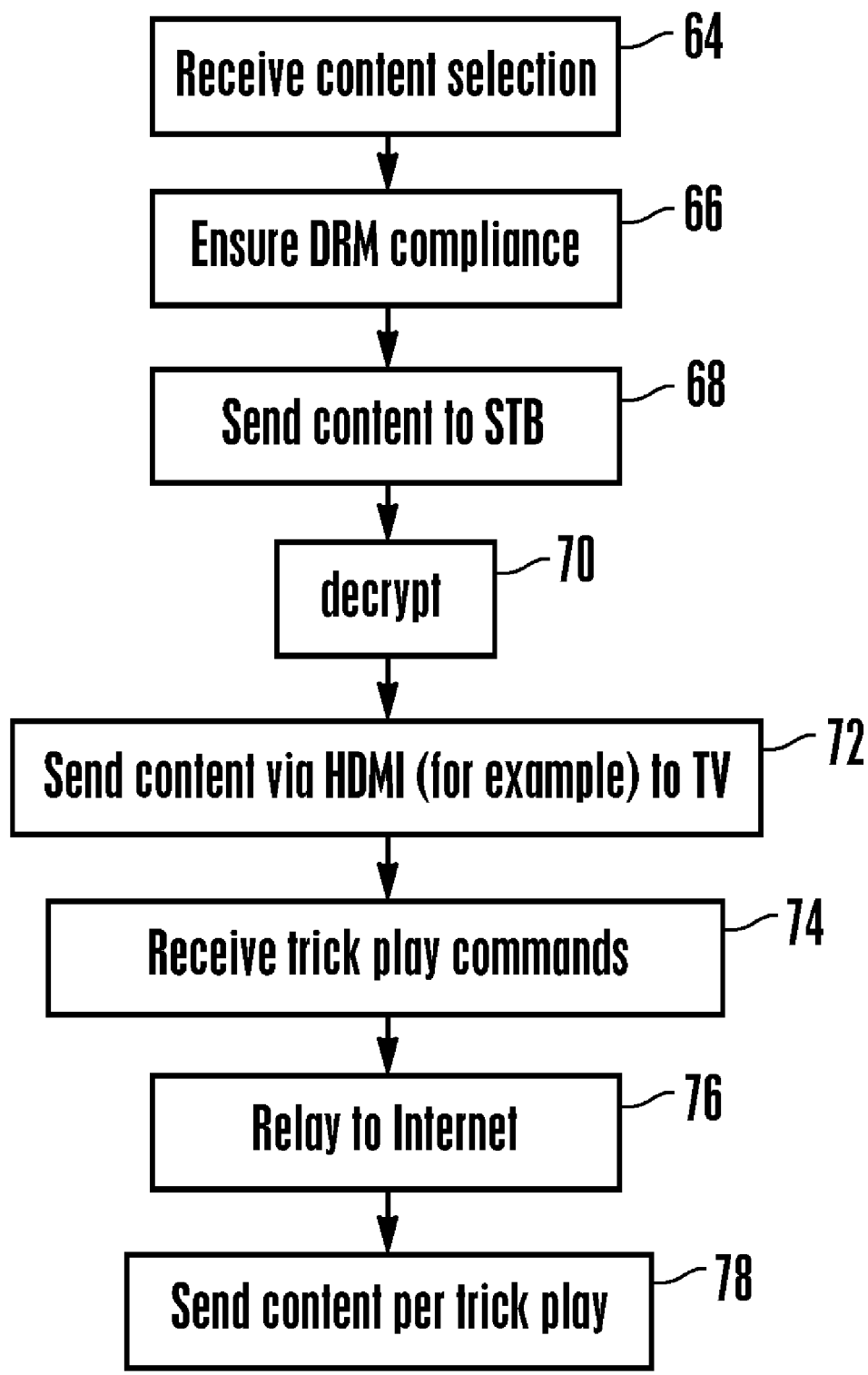
FIG. 3 is a flow chart of example operating logic.

Such logic may be seen in FIG. 3, which may commence at block 64 when the user manipulates the "PVR mode" select key 32 on the remote control 26. In response, the mode select signal is sent from the TV 12/STB 36 to the subscription server 46, which may return a list of content as compiled in FIG. 2 for display on the TV display 16. Using the remote control 26 the user can select a title on the list at block 64. The selection is sent through the TV 12/STB 36 to the server 46 which, after ensuring DRM compliance at block 66, sends the content over the Internet at block 68 to the STB 36, either from the local server media 50 or by using the pointer 56 to cause the relevant content server 54 to send the requested audio video content to the STB 36.

At block 70 the STB performs any necessary decryption on the content. At block 72 the STB sends the decrypted content over the HDMI link 38 when HDMI is used to the TV 12. Also, trick play commands may be received from the remote control 26 at block 74, and these trick play commands can be relayed from the TV 12/STB 36 to the subscription server 46 at block 76. At block 78 the subscription server implements the command, executing the PVR module 52 to pause, stop, fast-forward, reverse, skip, etc. through the content being provided to the STB as commanded by the remote control 26 signals.

In other words, if the user inputs "pause" the server 46 sends to the STB 36/TV 12 a freeze frame of video for presentation on the display 16. If the user selects "reverse" the server 46 sends the selected audio video in reverse for presentation thereof on the display 16. If the user selects "fast forward" the server 46 sends the video to the STB 36/TV 12 at a faster than normal frame rate. If the user selects "skip" the server omits the next segment of video in the content and immediately begins sending the subsequent segment, and so on, just as a PVR in the home would do.

If desired, the server 46 may execute dynamic bit-rate control. Feedback from the TV or STB to the server 46 regarding available home network bandwidth, home network TV/STB type/capability, etc. may be used to establish bit rate of content sent from the server to the TV/STB such that the information sent from the server to the TV/STB has a compression format that is compatible with the TV/STB. Information regarding current Internet-to-home link characteristics such as current Internet bandwidth to the TV/STB may also be used to establish a compression format for the content that is tailored to the particular device and network connection being employed by a user to access "his" Internet-based PVR.

In response to the above information, the server 46 can adjust the bit rate of the content that its outputs to the TV/STB to match those characteristics to optimize the video quality. Bit rate control may be executed by appropriately establishing transrating/transcoding. For example, the bit-rate of the stream might be reduced rather than have a still frame due to a lack of bits as the decoder starves.

Methods to reduce the bit rate include reducing the quantizer or even the resolution of the sent stream momentarily. The bit rate likewise might be increased by increasing the quantizer and/or resolution of the sent stream.

It may readily be appreciated that present principles permit remote access to preferred content when traveling without having to direct access to a home device to make home content available. For example, PVR content on the server 46 can be accessed using a suitably configured laptop, cell phone or other suitably enabled device to allow a user to watch TV recorded as commanded by the user anywhere the user has a network connection. It is to be appreciated that when using such other devices and other network connections, the above-described dynamic bit rate control is advantageous to tailor the bit rate to the particular device and network connection the user happens to employ.

Present principles also make possible the sharing of a PVR content list with others, who can access the server 46 to view the list including what title on the list is presently playing. Thus, the list may be provided by the server 46 to user-approved Internet addresses or names. Content itself might not be shared owing to DRM restrictions, but only the list of content along with, if desired, any content that does not have DRM restrictions.

While the particular WEB-BASED PERSONAL VIDEO RECORDER (PVR)-TYPE SUBSCRIPTION SERVICE is herein shown and described in detail, it is to be understood that the subject matter which is encompassed by the present invention is limited only by the claims.

What is claimed is:

1. A method comprising:
    receiving from a home entertainment component a recorder control signal including at least one signal being record a program, the control signal to record a program being received from a remote control having at least one personal video recorder (PVR) key, the control signal being generated by selecting a show from an electronic program guide (EPG) on a TV display for "recording";
    sending the signal through the Internet to a recorder subscription server which locates the requested content program and records an identification of the requested program along with a pointer to a content server on which the actual requested program resides for later playback on command; and
    responsive to a play command input using the remote control, receiving back from the Internet the requested program for play thereof on the TV display, wherein if the TV display is associated with a set top box (STB) the TV display at least sometimes receives content using a high definition multimedia interface (HDMI) link, and wherein if the TV display is not associated with a STB, a digital transmission content protection protocol is used to establish at least a portion of a link from the Internet to the TV display.

2. The method of claim 1, wherein a TV and/or a set-top box receives the control signal from a remote control.

3. The method of claim 2, wherein if the remote control transmits a "pause" signal the server sends to the STB and/or TV a freeze frame of video for presentation on a display associated with the TV.

4. The method of claim 2, wherein if the remote control transmits a "reverse" signal the server sends a selected audio video in reverse for presentation thereof on a display associated with the TV.

5. The method claim 2, wherein if the remote control transmits a "fast forward" the server sends video to the STB and/or TV at a faster than a normal frame rate.

6. The method of claim 2, wherein if the remote control transmits a "skip" signal the server omits a segment of video and immediately begins sending a subsequent segment.

7. A home system not including a personal video recorder (PVR) and comprising:
    remote control manipulable to send PVR command select signals to record a program listed on a user interface of a TV;
    TV receiving the PVR select signals; and
    Internet interface relaying the PVR command select signals to record a program associated with the select signals to an Internet server and in response receiving signals for display on the TV mimicking PVR functionality, wherein the user is presented with a prompt on the TV to request Internet PVR services and Internet PVR services are provided only responsive to the user accepting Internet PVR services wherein if the TV is associated with a set top box (STB) the TV display at least sometimes receives content using a high definition multimedia interface (HDMI) link, and wherein if the TV is not associated with a STB, a digital transmission content protection protocol is used to establish at least a portion of a link from the Internet to the TV display.

8. The system of claim 7, comprising a set top box (STB) implementing the Internet interface.

9. The system of claim 8, comprising a high definition multimedia interface (HDMI) link between the STB and TV.

10. The system of claim 7, comprising a digital transmission content protect (DTCP)-Internet Protocol link between the STB and TV.

11. A subscription server, comprising:
    processor receiving PVR commands over the Internet from a home entertainment system; and
    computer readable storage medium accessible to the processor and bearing a PVR module executable by the processor to provide audio video to the home entertainment system in accordance with the PVR commands, wherein a first user uniquely defines a list of the audio video, and at least the list is made available by the server to a second user upon authorization from the first user wherein if the home entertainment system is associated with a set to box (STB) the audio video travels in the home entertainment system at least part of the time using a high definition multimedia interface (HDMI) link, and wherein if the home entertainment system is not associated with a STB, a digital transmission content protection protocol is used to establish at least a portion of a link in the home entertainment system.

12. The server of claim 11, wherein if the PVR command is a "pause" signal the server sends to the home entertainment system a freeze frame of video for presentation on a display associated with a TV.

13. The server of claim 11, wherein if the PVR command is a "reverse" signal the server sends a selected audio video in reverse for presentation thereof on a display associated with a TV.

14. The server of claim 11, wherein if the PVR command is a "fast forward" the server sends video to the home entertainment system at a faster than a normal frame rate.

15. The server of claim 11, wherein if the PVR command is a "skip" signal the server omits a segment of video and immediately begins sending a subsequent segment.

16. The server of claim 11, wherein the server sends content to the home entertainment system only if the server determines that digital rights management (DRM) provisions have been satisfied by the home entertainment system or by a user thereof.

17. The server of claim 11, wherein a first user uniquely defines a list of the audio video, and the list is made available by the server to the first user regardless of physical location of the first user.

18. The server of claim 11, wherein the server receives information from the home entertainment system regarding home entertainment system characteristics, the information being used by the server to establish bit rate of content sent from the server to the home entertainment system such that the content has a compression format that is compatible with the home entertainment system.

19. The server of claim 11, wherein content is recommended to the home entertainment system based at least in part on content previously selected by the home entertainment system to be made available by the server.

* * * * *